Feb. 12, 1963  G. L. BATIE ET AL  3,077,327
FOLDING CHAIR WITH FISHING POLE HOLDER AND TACKLE BOX
Filed Aug. 28, 1959  2 Sheets-Sheet 1
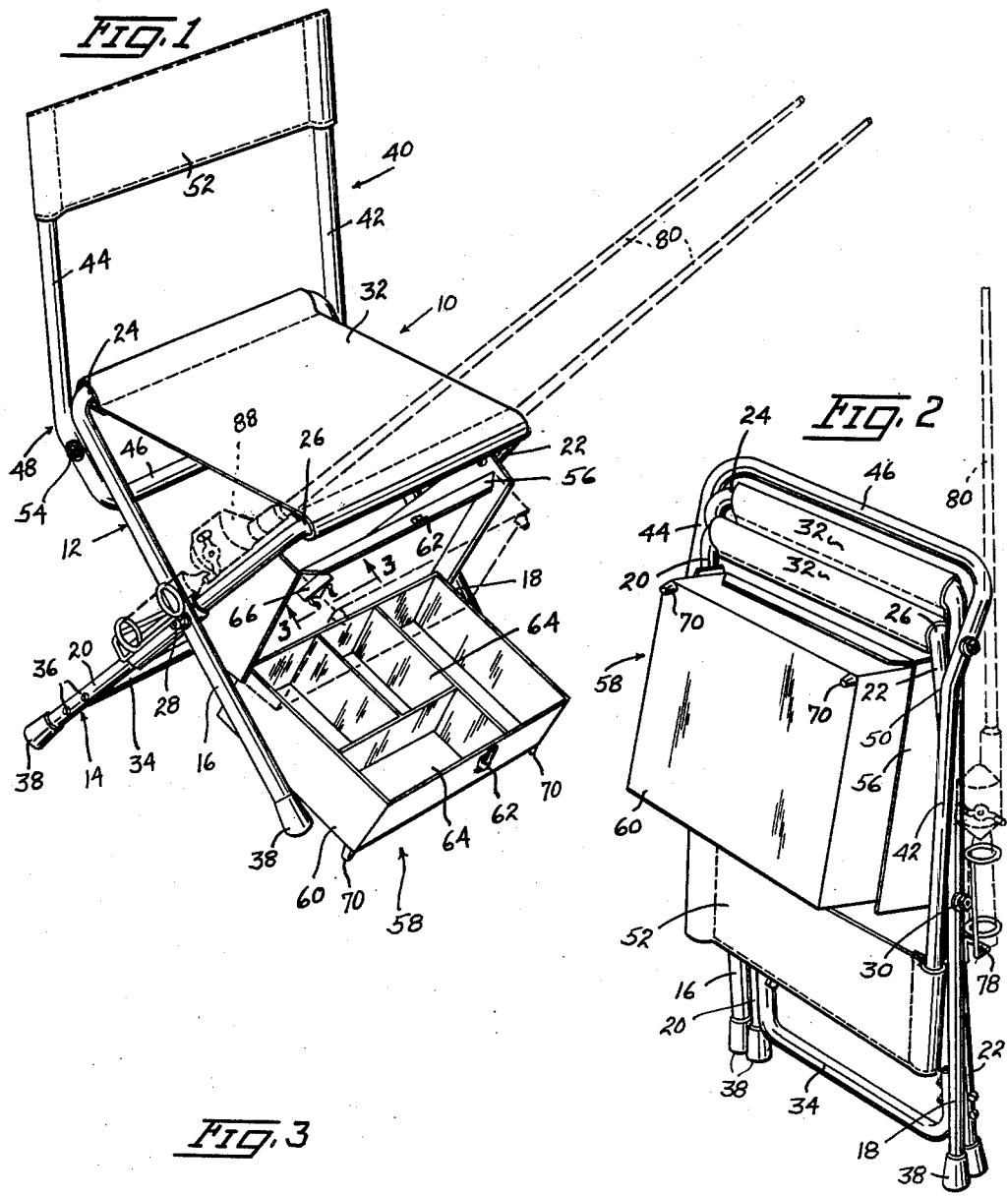
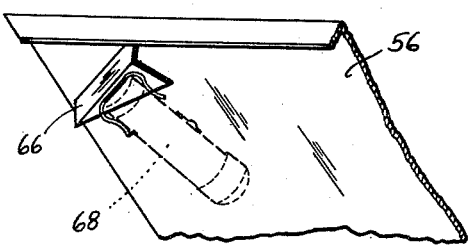
INVENTORS.
GLENN L. BATIE
EDMOND C. FUERST, SR.
VIRGIL U. SPEED
BY *Morton S. Adler*
ATTORNEY.

Feb. 12, 1963  G. L. BATIE ET AL  3,077,327
FOLDING CHAIR WITH FISHING POLE HOLDER AND TACKLE BOX
Filed Aug. 28, 1959  2 Sheets-Sheet 2
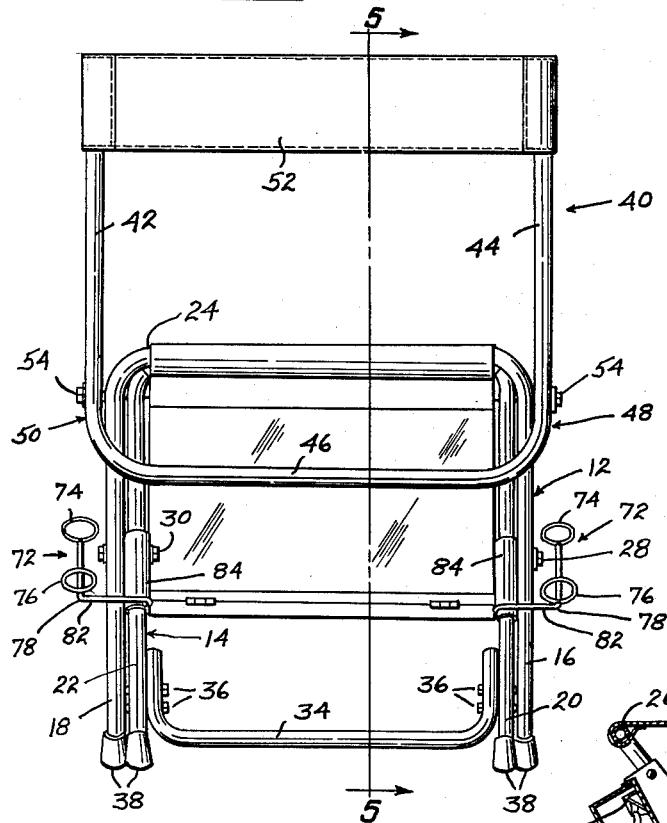
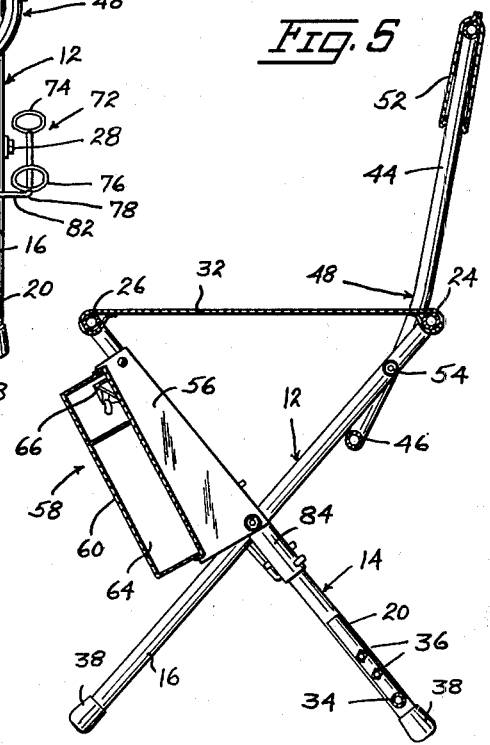
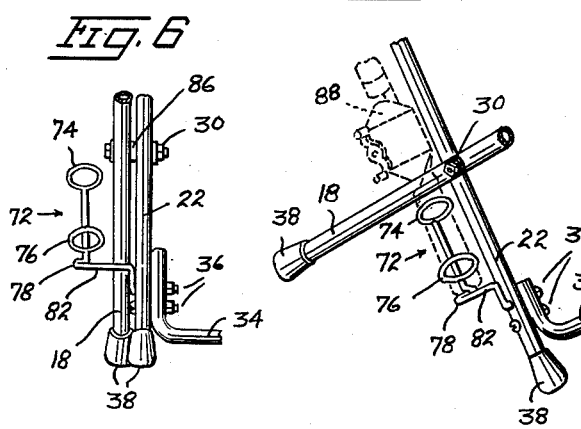
INVENTORS.
GLENN L. BATIE
EDMOND C. FUERST, SR.
VIRGIL U. SPEED
BY Morton S. Adler
ATTORNEY.

3,077,327
FOLDING CHAIR WITH FISHING POLE HOLDER AND TACKLE BOX
Glenn L. Batie, Orient, Edmond C. Fuerst, Sr., Lenox, and Virgil U. Speed, Orient, Iowa
Filed Aug. 28, 1959, Ser. No. 836,662
2 Claims. (Cl. 248—42)

This invention relates to a novel type chair which includes a variety of features designed to increase the comfort of a fisherman and to facilitate his enjoyment of the sport of fishing.

More particularly it is one of the objects herein to provide a light but sturdy, collapsible and portable chair that includes a tackle box as an integral part thereof.

Another object contemplated is the provision of a chair as indicated on which the tackle box is so located so as to be easily and conveniently accessible by the fisherman whether he is occupying the chair or not, and which box, when the chair is folded for non-use or transporting, or when in use, will hold the contents without spilling or disarrangement.

Still another object is the provision on such a chair of a fishing pole holder in which a fishing pole, or rod and reel, can be stored in an upright position when the chair is folded, and in which it can be held in an angular position for fishing purposes when the chair is extended.

Further objects and the more obvious advantages of this invention will be mentioned or else appear plainly from the description which follows.

This invention consists of novel parts and combination of parts to be hereinafter described whereby the objects set forth are attained, as pointed out in the claims, and illustrated in the accompanying drawings, in which:

FIG. 1 is a perspective front view of this chair when opened for use, showing the tackle box in open position in solid lines and in closed position in broken lines and also indicating in broken lines a pair of fishing poles supported by the chair, FIG. 2 is a front perspective view of this chair in folded position for storage or transporting, FIG. 3 is an enlarged fragmentary perspective view of the underside of the tackle box lid taken from the line 3—3 of FIG. 1 to illustrate the flashlight holder mounted thereto, FIG. 4 is a back elevational view of this chair in open position, FIG. 5 is a cross-sectional view taken on the line 5—5 of FIG. 4.

FIG. 6 is a fragmentary rear elevational view of the leg structure of this chair illustrating a modified form of attaching the fishing pole holder thereto, and FIG. 7 is a perspective view of the leg section shown in FIG. 6 with portions of a fishing pole indicated in broken lines.

Referring to the drawings the seat portion 10 of this chair includes a pair of leg sections 12 and 14 each of which consists of a length of rod or tubular material bent to form the respective pairs of parallel spaced outer legs 16 and 18 and the similarly arranged inner legs 20 and 22 connected at corresponding ends by the respective integral cross bars or pieces 24 and 26. Leg sections 12 and 14 are thus generally U-shaped in appearance with section 14 slightly smaller than section 12 so the sections can nest with legs 16 and 20 pivotally secured together intermediate their end by a bolt and nut or pin 28 and legs 18 and 22 similarly secured as at 30. Cross bars 24 and 26 are connected by a canvas 32 or other suitable means which serves to limit the open position of the leg sections 12 and 14, and provide a seat. A brace 34 connects the lower end portion of the inner legs 20 and 22 by suitable bolt means or the like 36 and the free end of each leg is preferably provided with a rubber tip or cap 38. This is a well known structure for collapsible stool means and no invention is claimed in the general arrangement so far described.

A back section 40 comprises the U-shaped rod or tubular frame defining a pair of parallel spaced supporting lengths 42 and 44 connected at the closed end portion by the integral cross bar member 46, and lengths 42 and 44 are slightly bent in the same direction at respective opposite points 48 and 50 so that bar 46 is off-set relative to a vertical alignment with the axes of lengths 42 and 44. A canvas or webbing 52 connects the outer ends of members 42 and 44 to serve as a back rest. The respective lengths 42 and 44 are pivotally secured to the respective legs 16 and 18 as at 54 near bar 24 as shown in FIGS. 1 and 4 so that bar 46 will abut against the underside of the upper portion of legs 16 and 18 when the chair is open and thus serve as a stop means to limit the inclination of the back 40 relative to the seat 10.

The top or lid portion 56 of a tackle box 58 is securely affixed to and between the inner legs 20 and 22 (FIGS. 1 and 2) and has a bottom portion 60 hingedly attached thereto so as to open forwardly and downwardly relative to seat 10 when the chair is in open or extended position. A suitable complementary snap or catch means 62 is provided on bottom 60 and top 56 as shown for obvious purposes. The bottom section may be divided into a plurality of compartments 64 and on the under or inner side of the lid 56, preferably in a corner, is a bracket or clamp 66 designed to hold a flashlight 68 in a position for directing light into compartments 64 if desired. Small legs 70 may also be placed on the outer corners at the underside of bottom 60.

A fishing pole or rod holder is attached to one, and preferably both, of the inner legs 20 and 22 and since they are of like construction, only one will be described and like numerals will be given to like parts on the other. With reference to leg 22 as seen in FIG. 4, the rod holder 72 comprises a length of rod material bent to form a pair of axially aligned spaced loops or rings 74 and 76 and with the rod length formed into a bend 78 in axial alignment outwardly from loop 76 to serve as a stop for the end of a fishing rod 80 (FIG. 2). The resulting rod length 82 extends from bend 78 to a sleeve 84 to which it is secured by any suitable means such as welding or the like. Such sleeve 84 is slidably mounted on leg 22 and is secured by the bolt or pin 30 which pivotally secures legs 18 and 22. Such sleeve also, by virtue of its position relative to the legs 18 and 22 serves the purpose of a washer. In FIGS. 6 and 7 a modified form of attaching holder 72 to leg 22 is shown wherein rod length 82 is provided with a threaded end and replaces one of the bolts 36 so that it serves not only in securing holder 72 to leg 22, but also in securing brace 34 thereto. In this form of attachment a washer 86 is placed on bolt or pin 30 between legs 18 and 22.

When this chair is folded or collapsed as shown in FIG. 2, the back 40 is tilted or pivoted forwardly so that the back rest 52 passes over the tackle box 58 to a position below it with bar 46 upended so that the three U-shaped members 12, 14 and 40 are all in the same relative position and the chair can be easily carried by grasping either of the bars 46 or 26. The tackle box 58, while tilted when the chair is collapsed, is not tilted to a degree that will permit the contents of the compartments 64 to fall out since the lid 56 serves as a closure over each compartment. It is also pointed out that in the closed position of the chair, the axes of the rod holder loops 74 and 76 are vertically disposed so that the rods 80 are in an upright position (FIG. 2) and can be carried in this position on the chair when it is moved about.

With the chair in open position (FIG. 1) the tackle box 58 is arranged directly under the forward end of seat 10 so that when the chair is used by a fisherman, such box is within easy reach in front of him and between his legs in a most natural and convenient position. Latch 62 is near to the top center front end of the seat 10 and the box bottom 56 containing his paraphernalia opens outwardly and downwardly as shown. The position of box 58 is not only convenient but by securing it to the chair as described, it serves as additional brace means in making the chair more sturdy. The flashlight holder 66 is so arranged that a flashlight 68 placed therein will illuminate compartments 64 when the situation requires. The position of rod holders 72 when the chair is opened is such to support the rods 80 at an angle to the ground (FIG. 1) so that the rods can be supported by the holders in a normal position for fishing purposes. Thus a fisherman can use this chair in a boat, on a dock or the bank of a stream or lake and enjoy the sport without the necessity of manually holding his rod at all times. As seen in FIG. 1, the reel 88 is in a convenient position to be manipulated when the rod 80 is in holder 72.

It will be appreciated that this chair as described is a most efficient and convenient piece of equipment for the fishing enthusiast. In one compact article he is provided with a comfortable chair, tackle box and rod holder. To change his fishing location, the fisherman can either close the tackle box and chair, or either, or leave them both open if the move is a short one, and by lifting this relatively light weight chair, all his equipment is contained in a single carrying unit.

It is submitted that the invention shown and described is aptly suited to achieve the purposes intended and is characterized by a combination of highly useful and mutually cooperating elements that combine their respective and proportionate functions in accomplishing the objects sought to be obtained.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

We claim:

1. A fisherman's chair comprising a pair of two legged folding leg sections wherein one leg of each section is pivotally secured to one leg of the other section, said connected legs in parallel adjacent relationship with each other when folded and angularly positioned relative to each other and to a supporting surface when opened, a collapsible seat member carried by said leg sections, a rigid tackle box including a bottom section and a lid hingedly secured thereto, complementary catch means on said lid and bottom section, said lid immovably secured to and between the legs on one of said leg sections so that said bottom section opens forwardly and downwardly relative to an occupant's position on said seat member, said lid being the only brace means on the portion of said leg section to which it is secured, a fishing rod holder carried by one of said leg sections, said leg section when closed positioning said rod holder to support a rod in a vertical position, and said leg section when opened positioning said rod holder in a forward upwardly angular position adjacent said seat member.

2. A fisherman's chair comprising a pair of two legged folding leg sections wherein one leg of each section is pivotally secured to one leg of the other section, said connected legs in parallel adjacent relationship with each other when folded and angularly positioned relative to each other and to a supporting surface when opened, a collapsible seat member carried by said leg sections, a fishing rod holder carried by one of said leg sections, said leg section when closed positioning said rod holder to support a rod in a vertical position, and said leg section when opened moving said rod holder in a forward upwardly angular position adjacent said seat member.

References Cited in the file of this patent

UNITED STATES PATENTS

| | | |
|---|---|---|
| 488,549 | Dugan | Dec. 27, 1892 |
| 1,243,958 | McFarland | Oct. 23, 1917 |
| 2,022,265 | Williams | Nov. 26, 1935 |
| 2,493,084 | Pharo | Jan. 3, 1950 |
| 2,909,215 | Mitchell | Oct. 20, 1959 |

FOREIGN PATENTS

| | | |
|---|---|---|
| 104,325 | Germany | July 12, 1899 |
| 956,374 | France | Aug. 1, 1949 |
| 694,988 | Great Britain | July 29, 1953 |